(12) United States Patent
Zhang et al.

(10) Patent No.: US 11,746,274 B1
(45) Date of Patent: Sep. 5, 2023

(54) IONIC LIQUID MONOMER FOR SYNTHESIS OF FRICTION REDUCER AND METHODS THEREOF

(71) Applicant: SAUDI ARABIAN OIL COMPANY, Dhahran (SA)

(72) Inventors: Xuan Zhang, Beijing (CN); Jose I. Rueda, Dhahran (SA); Ming Han, Dhahran (SA); Mohammed Bataweel, Dhahran (SA); Ziyuan Qi, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/680,880

(22) Filed: Feb. 25, 2022

(51) Int. Cl.
*C09K 8/035* (2006.01)
*C09K 8/68* (2006.01)

(52) U.S. Cl.
CPC ............... *C09K 8/035* (2013.01); *C09K 8/68* (2013.01)

(58) Field of Classification Search
CPC .... C09K 8/035; C09K 8/068; C09K 2208/28; Y10S 507/94
See application file for complete search history.

(56) References Cited

U.S. PATENT DOCUMENTS

| | | | |
|---|---|---|---|
| 6,030,928 | A | 2/2000 | Stahl et al. |
| 9,365,763 | B2 | 6/2016 | Tang |
| 2021/0147745 | A1 | 5/2021 | Bai et al. |

FOREIGN PATENT DOCUMENTS

| | | | |
|---|---|---|---|
| CN | 101648894 A | * | 2/2010 |
| CN | 101845115 A | | 9/2010 |
| CN | 103073676 B | | 10/2015 |

OTHER PUBLICATIONS

Guo, Hao, "Synthesis and evaluation of new slickwater fracturing fluid fordrag reduction", IOP Conf Series: Earth and Environmental Science, IOP Publishing, vol. 651, No. 032082, 2021 (8 pages).
Li, Wenwen and Rajesh K. Saini, "Polyacrylamide grafted polysaccharide as friction reducer for slickwater fracturing treatment", Journal of Macromolecular Science, Part A: Pure and Applied Chemistry, Taylor & Francis, 2020, pp. 1-6 (6 pages).
Liu, Zhi-yu, et al., "Impact of the Microstructure of Polymer Drag Reducer on Slick-Water Fracturing", Geofluids, Hindawi, vol. 2017, Article ID 9080325, pp. 1-8 (8 pages).
Ma, Yingxian, et al., "A high salt tolerance and low adsorption drag reducer based on non-covalent enhancement", Petroleum Exploration and Development, ScienceDirect, vol. 47, Issue 6, Dec. 2020, pp. 1333-1341 (9 pages).
Weng, Tingling, et al., "Synthesis of the polymerizable room temperature ionic liquid AMPS—TEA and superabsorbency for organic liquids of its copolymeric gels with acrylamide", Designed Monomers and Polymers, Taylor & Francis, vol. 17, No. 2, 2014, pp. 140-146 (7 pages).
Xing, Liang, et al., "Preparation and solution properties of polyacrylamide-based silica nanocomposites for drag reduction application", New Journal of Chemistry, Royal Society of Chemistry, 2020 (11 pages).
Yang, Xuejiao, et al., "Synthesis of two AMPS-based polymerizable room temperature ionic liquids and swelling difference between their co polymeric gels with HEMA", e-Polymers, vol. 14, No. 5, 2014, pp. 335-343 (9 pages).
Zhang, Yang, et al., "Preparation of a novel fracturing fluid with good heat and shear resistance", RSC Advances, Royal Society of Chemistry, vol. 9, 2019, pp. 1199-1207 (9 pages).

* cited by examiner

*Primary Examiner* — Aiqun Li
(74) *Attorney, Agent, or Firm* — Osha Bergman Watanabe & Burton LLP (57) ABSTRACT

A composition includes an ionic liquid monomer having the following structure:

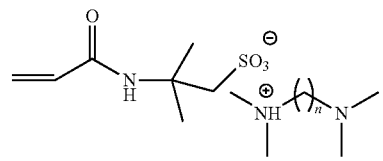

where n is an integer from 1 to 5 and the ionic liquid monomer has a melting point less than 100° C. A method of making the ionic liquid includes providing a mixture comprising a sulfonic acid and a diamine in a solvent, and maintaining the mixture at a temperature ranging from 10 to 80° C. for a time ranging from 1 to 10 hours to form an ionic liquid monomer having a melting point less than 100° C. A method of making a polymer from the ionic liquid monomer is also provided.

3 Claims, 4 Drawing Sheets

IONIC LIQUID MONOMER FOR SYNTHESIS OF FRICTION REDUCER AND METHODS THEREOF

BACKGROUND

Well stimulation enables the improved extraction of hydrocarbon reserves that conventional recovery processes, such as gas or water displacement, cannot access. One well stimulation technique that is widely employed is hydraulic fracturing, which involves the injection of a fluid into a formation at a pressure that is greater than the fracture pressure. This increases the size and extent of existing fractures within the formation and may create new fractures.

One method of hydraulic fracturing that is widely used, particularly in unconventional reservoirs, is slickwater fracturing. Rather than gels or other high viscosity fluids, slickwater fracturing involves the use of water as a treatment fluid, generally with additives. One key additive is a "friction reducer" that can reduce the friction generated as the fluid flows through restrictions. As compared to other hydraulic fracturing techniques, slickwater fracturing can offer benefits that include a simple operation, cost savings, and the generation of a complex fracturing network that increases the total stimulated reservoir volume.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition comprising an ionic liquid monomer having a structure as shown in formula (I):

(I)

where n is an integer from 1 to 5 and the ionic liquid monomer has a melting point less than 100° C.

In another aspect, embodiments disclosed herein relate to a method of making an ionic liquid monomer. The method includes providing a mixture comprising a sulfonic acid and a diamine in a solvent, and maintaining the mixture at a temperature ranging from 10 to 80° C. for a time ranging from 1 to 10 hours to form an ionic liquid monomer having a melting point less than 100° C.

In yet another aspect, embodiments disclosed herein relate to a method of making a polymer. The method includes providing an aqueous solution comprising a first monomer, adding a mixture comprising a weak base and a strong base to the aqueous solution comprising the first monomer to maintain the aqueous solution at a predetermined pH range, adding a second monomer, a third monomer, and a fourth monomer to the aqueous solution to provide a monomer mixture, adding an azo initiator and a redox initiator to the monomer mixture at a temperature ranging from 0 to 50° C., and maintaining the monomer mixture at the temperature ranging from 0 to 50° C. for a time ranging from one to 10 hours to provide the polymer. In such methods, the fourth monomer is an ionic liquid monomer having a melting point less than 100° C.

Other aspects and advantages of the claimed subject matter will be apparent from the following description and the appended claims.

DETAILED DESCRIPTION

Slickwater fracturing generally requires an injection rate that exposes the friction reducers to a shear rate that can deteriorate the friction reducer. Additionally, conventional friction reducers may be inefficient and not readily compatible in high salinity environments, such as synthetic or natural seawaters, brines, or produced waters. Fresh water has generally been used as the base fluid for slickwater fracturing. However, obtaining enough fresh water is often challenging. Slickwater treatment fluids also often have a limited proppant transporting capacity due to their low viscosity. Large amounts of fresh water may be required to place enough proppant in a fracture consequently.

One or more embodiments generally relate to an ionic liquid monomer used to prepare polymers and its preparation. The corresponding polymers may be included in wellbore treatment fluids as friction reducers. Generally, the friction reducers of one or more embodiments are made from a composition that includes an ionic liquid monomer.

Advantageously, the friction reducers in accordance with one or more embodiments may provide an improved viscosification, hydration and friction reduction.

Ionic Liquid Monomer Composition

In one aspect, embodiments disclosed herein relate to a composition comprising an ionic liquid monomer. As used herein, an "ionic liquid" refers to a salt in which the ions are poorly coordinated, which results in these salts being liquid at temperatures below 100° C. A "room temperature ionic liquid" is an ionic liquid that is a liquid at room temperature (i.e., at a temperature of about 20 to 30° C.). In comparison to conventional solid salt monomers used in polymer synthesis, ionic liquid monomers can improve the water solubility of a synthesized polymer.

In one or more embodiments, the ionic liquid monomer has a structure as shown in formula (I):

wherein n is an integer from 1 to 5. The ionic liquid shown in Formula (I) may have a melting point of less than 100° C. In particular embodiments, it may be a room temperature ionic liquid having a melting point of less than 30° C.

In one or more particular embodiments, the ionic liquid monomer has a structure as shown in formula (II):

As used herein, the structure shown in Formula (II) may also be referred to as "AMPS-TMEDA" as it is an ionic liquid of AMPS (2-acrylamido-2-methylpropane sulfonic acid) and TMEDA (N,N,N',N'-tetramethylethylenediamine).

As noted above, the ionic liquid monomer in accordance with the present disclosure is a liquid at room temperature. Thus, in one or more embodiments, the ionic liquid monomer has a melting point less than 100° C.

Method of Making an Ionic Liquid Monomer

In another aspect, embodiments disclosed herein relate to a method of making a the previously described ionic liquid monomer. The method generally includes providing a mixture comprising a sulfonic acid and a diamine in a solvent and maintaining the mixture at a temperature ranging from 10 to 80° C. for a time ranging from 1 to 10 hours. Such methods yield an ionic liquid monomer having a melting point of less than 100° C.

Generally, the sulfonic acid and diamine reactants are included in an equal molar amount, meaning a molar ratio of about 1:1. In some embodiments, a slight excess of diamine reactant may be used providing a molar ratio of sulfonic acid to diamine of 1:1.1.

As noted above, the method may include providing a mixture comprising a sulfonic acid and a diamine in a solvent. The sulfonic acid is not particularly limited, provided it has a sulfonic acid group (i.e., $HS(=O)_2(OH)$). In one or more particular embodiments the sulfonic acid may be 2-acrylamido-2-methylpropane sulfonic acid (AMPS).

The diamine in the mixture of the sulfonic acid and diamine in a solvent is not particularly limited. In one or more embodiments, the diamine includes two amine groups connected by a hydrocarbon chain having 1 to 5 hydrocarbons. Examples of suitable diamines include N,N,N',N'-tetramethylethylenediamine (TMEDA), N,N,N',N'-Tetramethyldiaminomethane (TMMDA), N,N,N',N'-tetramethyl-1,3-propanediamine (TMPDA), N,N,N',N'-tetramethyl-1,4-butanediamine (TMBDA). The diamines may be used along or in combination. In one or more particular embodiments the diamine may be N,N,N',N'-tetramethylethylenediamine (TMEDA).

Furthermore, the solvent is not particularly limited, but is generally a polar solvent suitable for dissolving the sulfonic acid and diamine compounds. In one or more embodiments, the solvent may be selected from the group consisting of acetone, ethanol, water, and combinations thereof.

The reaction may be conducted at a temperature sufficient to form the ionic liquid monomer. In one or more embodiments, the reaction temperature may be from about 10 to 80° C. The reaction temperature may have a lower limit of one of 10, 15, 20, 25, 30, and 35° C. and an upper limit of one of 40, 45, 50, 55, 60, 65, 70, 75 and 80° C., where any lower limit may be paired with any upper limit. The specific reaction temperature may be chosen to avoid polymerization of the sulfonic acid reactant, while enabling ionic liquid monomer formation. In particular embodiments, the reaction temperature is about 25° C.

The reaction progress may be monitored by monitoring the pH. In one or more embodiments, a pH above 7 indicates that the reaction is complete.

After the reaction is complete and the ionic liquid monomer has formed, the solvent may be removed under reduced pressure at elevated temperature. For example, after the reaction is complete, vacuum may be used to remove any remaining solvent from the mixture. Removal of the solvent under reduced pressure may be conducted at a temperature ranging from about 30 to 80° C. The temperature of this step may have a lower limit of one of 30, 35, 40, 45, and 50° C., and an upper limit of one of 55, 60, 65, 70, 75, and 80° C., where any lower limit may be paired with any mathematically compatible upper limit. The temperature should be sufficient to remove any remaining solvent without affecting the ionic liquid monomer. Accordingly, the temperature used in this step may be chosen based on the solvent used in the reaction. In one or more particular embodiments, the solvent is removed at a temperature of about 30° C. In order to ensure that all the solvent has been removed, reaction mixtures may be weighed before and after being subjected to reduced pressure. The variation in weight is used to determine how much solvent has been removed. After removal of solvent(s), the resultant product is the ionic liquid monomer as previously described.

Method of Making a Polymer

In yet another aspect, embodiments disclosed herein relate to a method of making a polymer. The polymer may be made using the previously described ionic liquid monomer as one of the monomers. The polymer described herein may be particularly suitable as a dry friction reducer in hydraulic fracturing applications.

In one or more embodiments, the method of making the polymer is an aqueous free radical polymerization that includes providing an aqueous solution comprising a first monomer, adding a mixture comprising a weak base and a strong base to the aqueous solution comprising the first monomer to maintain the aqueous solution at a predetermined pH range, adding a second monomer, a third monomer, and a fourth monomer to the aqueous solution to provide a monomer mixture, adding an azo initiator and a redox initiator to the monomer mixture at a temperature ranging from 0 to 50° C., and maintaining the monomer mixture at the temperature ranging from 0 to 50° C. for a time ranging from one to 10 hours to provide the polymer.

As noted above, a first step in the disclosed method includes providing an aqueous solution comprising a first monomer. The first monomer may be a sulfonic acid monomer. In one or more particular embodiments, the first monomer is AMPS.

A mixture of a weak base and a strong base may be added to the aqueous solution including the first monomer to maintain the pH of the disclosed aqueous solution in an acceptable range. Conducting the polymer synthesis within a specific pH range may provide a polymer that has enhanced properties, such as good solubility and friction reduction. In one or more particular embodiments, the pH range is from 6 to 10. The weak base and the strong base are not particularly limited. The weak base may be used to neutralize the AMPS, whereas the strong base may be used to adjust the pH of the reaction. In one or more particular embodiments, the strong base may be sodium hydroxide. In one or more particular embodiments, the weak base may be sodium bicarbonate ($NaHCO_3$).

After the addition of the strong and weak bases to achieve a suitable pH for the reaction, a second monomer, a third monomer, and a fourth monomer may be added to the aqueous solution to provide a monomer mixture. The monomer mixture is composed of all of the monomers that make up the constituent units of the polymer.

In one or more embodiments, the second monomer is acrylamide (AA). In one or more embodiments, the third monomer is N,N-dimethylacrylamide (DMAA). In one or more embodiments, the fourth monomer is the ionic liquid monomer described above.

The molar ratio of each of the first, second, third and fourth monomers may be chosen based upon the desired structure of the final polymer. In one or more particular embodiments, each of the first, second, third and fourth monomers may be provided in a molar ratio range of about 20-50:100:2-10:0.5-5. That is, the molar amount of the first monomer may range from 20 to 50, the molar amount of the second monomer may be about 100, the molar amount of the third monomer may range from 2 to 10, and the molar amount of the fourth monomer may range from 0.1 to 5. The first monomer may be present in the polymer in an amount having a lower limit of one of 20, 22, 24, 26, 28, 30, 32, 34, 36, and 38, and an upper limit of one of 36, 38, 40, 41, 44, 46, 48, and 50, where any lower limit may be paired with any mathematically compatible upper limit. Additionally, the third monomer may be present in the polymer in an amount having a lower limit of one of 2, 3, 4, 5, and 6, and an upper limit of one of 5, 6, 7, 8, 9, and 10, where any lower limit may be paired with any mathematically compatible upper limit. Finally, the fourth monomer may be present in the polymer in an amount having a lower limit of one of 0.1, 0.2, 0.3, 0.5, 1.0, 1.5, 2.0, and 2.5, and an upper limit of any of 2.0, 2.5, 3.0, 3.5, 4.0, 4.5, and 5.0, where any lower limit may be paired with any mathematically compatible upper limit.

Once all of the monomers are combined to form a monomer mixture, the monomer mixture may be degassed using an inert atmosphere such as nitrogen or argon. The degassing step may be performed for about 0.5 to 3 hours at a temperature of about 25° C. After the monomer mixture has been sufficiently degassed to remove any atmospheric oxygen, an azo initiator and redox initiator may simultaneously be added to initiate polymerization. The initiators may be added at a temperature ranging from about 0 to 50° C. Any temperature within the given range may be used, provided that it is sufficient to initiate polymerization.

In one or more embodiments, the redox initiator is an ionic, water-soluble initiator such as $K_2S_2O_8$—$NaHSO_3$ or $K_2S_2O_8$-TMEDA (KPS-TMEDA). In one or more embodiments, the azo initiator is water soluble. Suitable water-soluble azo initiators include, but are not limited to, 2,2'-Azobis(2-(2-imidazolin-2-yl) propane)dihydrochloride (AIBI), 2,2"-Azobis-(N,N"-dimethyleneisobutyramidine) (API), and 2,2'-azobis[2-methylpropionamidine] dihydrochloride (Aiba), and 4,4'-Azobis(4-cyanovaleric acid) (ACVA).

A suitable amount of each initiator may be used to initiate polymerization. For example, in one or more embodiments, 0.005 to 0.2 wt % (weight percent) based on the total weight of the monomers of the redox initiator may be used. The amount of redox initiator may have a lower limit of one of 0.005, 0.007, 0.01, and 0.02 wt % and an upper limit of one of 0.05, 0.07, 0.10, 0.15, and 0.20 wt %, where any lower limit may be paired with any upper limit. In one or more embodiments, the azo initiator may be included in an amount ranging from 0.01 to 0.2 wt % based on the total weight of the monomers in solution. The amount of azo initiator may have a lower limit of one of 0.01, 0.02, 0.03, 0.04, 0.05, and 0.06 wt % and an upper limit of one of 0.07, 0.08, 0.09, 0.10, 0.15, 0.17 and 0.20 wt %, where any lower limit may be paired with any upper limit.

Once the initiators have been added, the polymerization reaction may proceed until completion. In one or more embodiments, the components of the redox initiator (e.g., KPS and TMEDA) react via a redox reaction to produce free radical. Then the free radicals may initiate polymerization at low temperature, producing heat. The heat and the free radicals may then result in decomposition of the azo initiator to produce new free radicals. The new free radicals can aid in achieving a liner structure and high molecular weight in the resultant polymer, which can improve polymer solubility and viscosification.

Reaction completion may be determined by the viscosity of the mixture. For a desired polymerization, multiple samples may be polymerized for a variety of time periods, after which their viscosities are measured. The sample with the highest viscosity may be correlated with the sufficient reaction time. In one or more embodiments, the polymerization time may range from a lower limit of one of 1, 2, 3, 4 and 5 hours and an upper limit of one of 6, 7, 8, 9, and 10 hours, where any lower limit may be paired with any upper limit. The temperature during polymerization may be in a range of from 0 to 50° C. Any temperature within the given range may be used, provided that it is sufficient to promote polymerization. As such, a specific temperature may be chosen based on the specific monomers used.

Once the reaction is complete and the polymer is formed, the polymer may be separated via precipitation with a polar solvent such as ethanol, methanol, or acetone.

Figure 1:
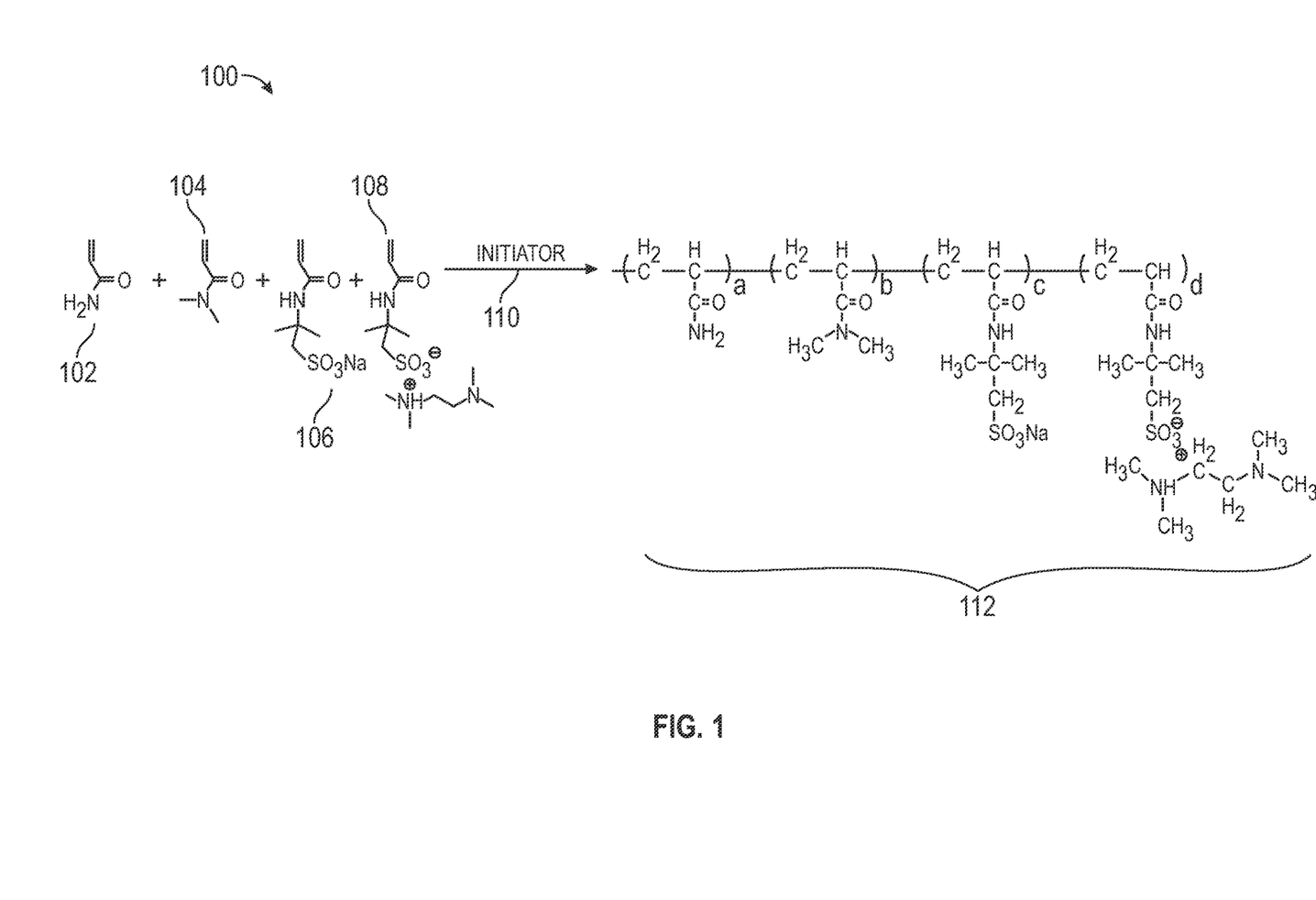
FIG. 1 is a reaction scheme for making a friction reducer in accordance with one or more embodiments.

A polymerization reaction scheme 100 in accordance with one or more embodiments is shown in FIG. 1. The reaction scheme 100 shows that the first monomer 102, the second monomer 104, the third monomer 106, and the fourth monomer 108 may be combined in the presence of an initiator 110 (e.g., the previously described redox and azo initiators) to form a polymer 112. In the polymer 112 shown in FIG. 1, the molar ratio of a:b:c:d is 100:5:30:0.1

The molecular weight of embodiment polymers may be determined according to known techniques, as will be appreciated by a person with skill in the art. Polymers in accordance with the present disclosure may have a weight average molecular weight ($M_w$) ranging from 3.0 to 13.0 MDa (megadalton). For example, polymers may have a molecular weight having a lower limit of one of 3.0, 3.5, 4.0, 4.5, 5.0, 5.5, 6.0, 6.5, 7.0, 7.5, and 8.0 MDa and an upper limit of one of 8.5, 9.0, 9.5, 10.0, 10.5, 11.0, 11.5, 12.0, 12.5, and 13.0

MDa, where any lower limit may be paired with any mathematically compatible upper limit.

Polymers in accordance with the present disclosure may have a number average molecular weight ($M_N$) ranging from 3.0 to 9.0 MDa. For example, polymers may have a molecular weight having a lower limit of one of 3.0, 3.5, 4.0, 4.5, 5.0, 5.5, and 6 MDa, and an upper limit of one of 6.5, 7.0, 7.5, 8.0, 8.5, and 9.0 MDa, where any lower limit may be paired with any mathematically compatible upper limit.

Polymers in accordance with the present disclosure may have a viscosity average molecular weight ($M_V$) ranging from 3.0 to 13.0 MDa. For example, polymers may have a molecular weight having a lower limit of one of 3.0, 3.5, 4.0, 4.5, 5.0, 5.5, 6.0, 6.5, 7.0, 7.5, and 8.0 MDa and an upper limit of one of 8.5, 9.0, 9.5, 10.0, 10.5, 11.0, 11.5, 12.0, 12.5, and 13.0 MDa, where any lower limit may be paired with any mathematically compatible upper limit.

Polymers in accordance with the present disclosure may have a polydispersity index (PDI) ranging from 1.3 to 1.5. Polydispersity is a measure of polymer heterogeneity based on size, and may be measured according to methods known to a person with skill in the art. In one or more embodiments, polymers may have a PDI having a lower limit of one of 1.3, 1.32, 1.34, 1.36, 1.38 and 1.4, and an upper limit of one of 1.42, 1.44, 1.46, 1.46, and 1.5, where any lower limit may be paired with any mathematically compatible upper limit.

Wellbore Treatment Fluid

One or more embodiments of the present disclosure relate to wellbore treatment fluids. In one or more embodiments, the wellbore treatment fluid may comprise a fracturing fluid for use in slickwater fracturing as previously described.

A wellbore treatment fluid of one or more embodiments may comprise an aqueous base fluid. The aqueous base fluid may include at least one of a natural or synthetic water, or a combination thereof. Examples of water include, but are not limited to, fresh water, natural and synthetic seawaters, natural and synthetic brines, brackish, formation, produced, and mixtures of waters thereof.

The aqueous base fluid may be synthetically formulated or naturally contain one or more salts. The salts may include, but are not limited to, alkali metal and alkaline earth metal halides, hydroxides, carbonates, bicarbonates, sulfates, and phosphates. Salts may include both organic and inorganic components. Salts may include ionic compounds that produce disassociated ions of, for example, sodium, calcium, aluminium, magnesium, potassium, strontium, lithium, halides, carbonates, bicarbonates, sulfates, chlorates, bromates, nitrates, oxides, and phosphates. Examples of salts include alkali metal halides, alkali metal sulfates, alkaline earth metal halides, and alkali metal bicarbonates. Specific salts include, but are not limited to, sodium chloride, calcium chloride, magnesium chloride, sodium sulfate, and sodium bicarbonate.

The aqueous base fluid may have a total dissolved solids (TDS) of 1,000 milligrams per liter (mg/L) or more, such as 10,000 mg/L or more, such as 50,000 mg/L or more, such as 57,000 mg/L, or such as 100,000 mg/L or more. In one or more embodiments, the aqueous fluid may have a TDS of an amount ranging from a lower limit of any of 1,000, 5,000, 10,000, 30,000, 50,000, 70,000, 80,000, 90,000, and 100,000 mg/L to an upper limit of any of 60,000, 75,000, 100,000, 150,000, 200,000, 250,000, and 350,000 mg/L, where any lower limit can be used in combination with any mathematically-compatible upper limit. In one or more embodiments, the aqueous base fluid is a synthetic or natural seawater or brine where the TDS of the aqueous base fluid is in a range of from about 1,000 to 350,000 mg/L TDS. In some such embodiments, the seawater or brine is synthetic. The maximum concentration is determined by the solubility of the salt in water as well as with any other salts and impurities present.

A person of ordinary skill in the art would appreciate with the benefit of this disclosure that the density of aqueous fluid, and, in turn, of the wellbore treatment fluid, may be affected by the salt concentration of the aqueous fluid.

In one or more embodiments, wellbore treatment fluids may contain a polymer as previously described as a friction reducer. The friction reducer of the one or more embodiments of the wellbore treatment fluid may be present in a range of from about 2 to 60 pounds per thousand gallons (pptg). For example, the wellbore treatment fluid may contain the friction reducer in an amount ranging from a lower limit of any of 2, 3, 4, 5, 6, 8, 10, 12, 15, and 20 pptg to an upper limit of any of 25, 30, 35, 40, 45, 50, 55, and 60 pptg, where any lower limit can be used in combination with any mathematically-compatible upper limit.

Other additives may be included in the wellbore treatment fluids of the present disclosure. Such additives may include, but are not limited to, proppants, viscosifiers, pH adjusting agents, wetting agents, corrosion inhibitors, scale inhibitors, oxygen scavengers, anti-oxidants, biocides, surfactants, dispersants, interfacial tension reducers, mutual solvents, thinning agents, breakers, crosslinkers, and combinations thereof. The identities and use of the additives are not particularly limited and may be any suitable additive known to a person of ordinary skill in the art. One of ordinary skill in the art will, with the benefit of this disclosure, appreciate that the inclusion of a particular additive will depend upon the desired application and properties of one or more embodiments of the wellbore treatment fluid.

As described, a wellbore treatment fluid may include a weighing agent. Weighting agents suitable for use in the wellbore treatment fluids of one or more embodiments include, but are not limited to, bentonite, barite, dolomite, calcite, aragonite, iron carbonate, zinc carbonate, manganese tetroxide, zinc oxide, zirconium oxide, hematite, ilmenite, lead carbonate, and combinations thereof.

A wellbore treatment fluid of one or more embodiments may include a proppant. A proppant is a material that may be transported into the wellbore by the one or more embodiments of the wellbore treatment fluid and deposited in an induced fracture of a formation. In doing so, the induced fracture remains at least partially open during or after completion of the treatment or removal of the remaining wellbore treatment fluid. In one or more embodiments, the proppant may include, but is not limited to, sand, polymer-coated sand, gravel, glass, polymers, ceramics, silica, alumina, carbon black, graphite, mica, titanium dioxide, metasilicate, calcium silicate, metal oxides, kaolin, talc, and fly ash. In one or more embodiments, the proppant may comprise particle sizes distributed around one or more different average particle sizes.

The wellbore treatment fluid of one or more embodiments may comprise a proppant in an amount in a range of from about 1 to 10 pounds per gallon (lb/gal). For example, the wellbore treatment fluid may contain the proppant in an amount ranging from a lower limit of any of 1, 2, 3, 4, and 5 lb/gal, to an upper limit of any of 4, 5, 7, 9, and 10 lb/gal, where any lower limit can be used in combination with any mathematically-compatible upper limit.

A person of ordinary skill in the art will appreciate, with the benefit of this disclosure, that the physical properties of a wellbore treatment fluid are important in determining the suitability of the fluid for a given application.

The wellbore treatment fluid may have a suitable viscosity in a brine having a TDS as described above. In one or more embodiments, the viscosity of a brine including the friction reducer in accordance with one or more embodiments, may be from 1 to 30 mPa·s (millipascal seconds), when measured at shear rate of 170 s$^{-1}$ using a Brookfield DVIII viscometer. The viscosity may have a lower limit of any one of 1, 5, 8, 10 and 15 mPa·s, and an upper limit of any one of 18, 20, 25, 27 and 30 mPa·s, where any lower limit may be paired with any upper limit.

The wellbore treatment fluid in accordance with one or more embodiments may display suitable hydration behavior, meaning it may dissolve and viscosify in a brine in a reasonable period of time for use as a friction reducer. In one or more embodiments, the dissolution time of the friction reducer may be measured by monitoring the viscosity of a brine after the addition of the dry friction reducer. As described herein, the dissolution time is determined by adding 500 ml of a brine to a flask and stirring at a rate of 1000 rpm (revolutions per minute) at 25° C. to obtain a good vortex. The friction reducer may then be added into the solution. The apparent viscosity of friction reducer solution is measured using a Discovery HR-2 Rheometer (TA Instrument) at a shear rate of 170 s$^{-1}$. The viscosifying rate is calculated using equation (I) below:

$$\upsilon = \frac{\mu_{5\ min}}{\mu_{4\ h}} \qquad \text{Equation (I)}$$

where $\upsilon$ is the thickening rate, $\mu_{5\ min}$ is the solution viscosity at 5 minutes, and $\mu_{4\ h}$ is the solution viscosity at 4 hours. For use as a dry friction reducer, the thickening rate $\upsilon$ should be at least 85% when the friction reducer is dry powder. In one or more embodiments, the friction reducer may achieve a thickening rate of 85% in not greater than 10 seconds, not greater than 15 seconds, not greater than 20 seconds, not greater than 25 seconds, not greater than 30 seconds, not greater than 40 seconds, or not greater than 50 seconds. In one or more embodiments, the friction reducer may achieve a thickening rate of 95% in not greater than 20 seconds, not greater than 30 seconds, not greater than 40 seconds, or not greater than 50 seconds, not greater than 60 seconds, not greater than 80 seconds, note greater than 100 seconds, not greater than 120 seconds, or not greater than 180 seconds.

In one or more embodiments, the inclusion of a friction reducer as described previously may reduce the friction associated with the flow of the wellbore treatment fluid compared to a corresponding wellbore treatment fluid that does not contain the friction reducer.

Method of Preparing a Wellbore Treatment Fluid

A wellbore treatment fluid in accordance with one or more embodiments of the present disclosure may be made by any suitable method known in the art for making wellbore treatment fluids. For example, in one or more embodiments, an amount of friction reducer may be added into an aqueous fluid. The aqueous fluid includes a water and may include salts and dissolved solids as previously described. Any additives may then be added into the aqueous fluid such that the wellbore treatment fluid forms. The wellbore treatment fluid may include additives as previously described, such as weighing agents and proppants.

Method of Use a Wellbore Treatment Fluid

Wellbore treatment fluids of one or more embodiments may be introduced into a wellbore or subterranean formation using techniques known to a person of ordinary skill in the art.

In one or more embodiments, the wellbore treatment fluid comprising the friction reducer is utilized as a slickwater fracturing fluid. A slickwater fracturing fluid is useful to stimulate hydrocarbon production from a subterranean zone, such as a reservoir or a hydrocarbon-bearing formation. For example, multiple barrels of the wellbore treatment fluid are prepared as described here, where each barrel contains components as previously described. The multiple barrels of the wellbore treatment fluid are then introduced into a reservoir at a pressure greater than the fracture pressure of the reservoir. In such an instance, the reservoir is in fluid communication with the wellbore.

In one or more embodiments, the wellbore treatment fluid is introduced at a pressure greater than the fracture pressure of the hydrocarbon-bearing formation in fluid communication with the wellbore.

In one or more embodiments, the wellbore treatment fluid may further comprise proppants. By introducing the slickwater fracturing fluid, the proppants may be deposited in the cracks and fissures created by introducing the fracturing fluid into a reservoir at a pressure greater than the fracture pressure of the reservoir. The result is that an increase in permeability and hydrocarbon flow may occur from the treated reservoir. In one or more embodiments, the fracturing process may be repeated. In subsequent treatments, the subsequent fracturing process may involve the use of a well treatment fluid having a different composition than the first well treatment fluid.

EXAMPLES

The following examples are merely illustrative and should not be interpreted as limiting the scope of the present disclosure.

Example 1: Synthesis of Ionic Liquid Monomer AMPS-TMEDA 2-acrylamido-2-methylpropane sulfonic acid (AMPS) (Sigma Aldrich, used as received) (50 mmol) were dissolved in 200 ml acetone (Sigma Aldrich, used as received) and then N,N,N',N'-tetramethylethylenediamine (TMEDA) (Sigma Aldrich, used as received) (50 mmol) was added under stirring. The mixture was stirred at 25° C. for 4 hrs. After the reaction was completed, acetone was removed under reduced pressure to get a viscous transparent yellow ionic liquid monomer (AMPS-TMEDA). The yield was about 97.71%.

Example 2: Synthesis of Friction Reducer 1

A polymer was prepared via an aqueous free-radical copolymerization. Monomer AMPS (Sigma Aldrich, used as received) (124.34 g) was dissolved in deionized water (848.66 g) in a 2000 ml flask. NaHCO$_3$ (Sinopharm Chemical Reagent Co., Ltd. (China), used as received) and NaOH (Sinopharm Chemical Reagent Co., Ltd. (China), used as received) was added to maintain a pH of about 7. After the solution was stirred for 15 min, acrylamide (AM) (Sigma Aldrich, used as received) (142.16 g), N,N-Dimethylacrylamide (DMAA) (9.91 g) and AMPS-TMEDA (6.46 g) as provided in Example 1 were added into the flask. The flask was purged with N$_2$ for 2 hr. The solution was then heated to 20° C. in a tempering kettle under nitrogen atmosphere. The initiator (i.e., 0.025 wt % of 2,2'-Azobis(2-(2-imidazolin-2-yl) propane)dihydrochloride (AIBI) (Sigma Aldrich, used as received) and 0.0166 wt % of a 1% solution of $K_2S_2O_8$ (KPS) (Sinopharm Chemical Reagent Co., Ltd. (China), AR) was added to the mixture. After 15 mins, 0.0084 wt % TMEDA was added to provide $K_2S_2O_8$-TMEDA as an initiator (KPS-TMEDA). Then, the polymerization proceeded for 8 hours under nitrogen atmosphere. After that, the polymer was purified by precipitation with ethanol and dried in vacuum oven at 40° C. for 48 h. The yield was 92.69%. The polymer produced under such reaction condition was referred to as Friction Reducer 1.

Figure 2:
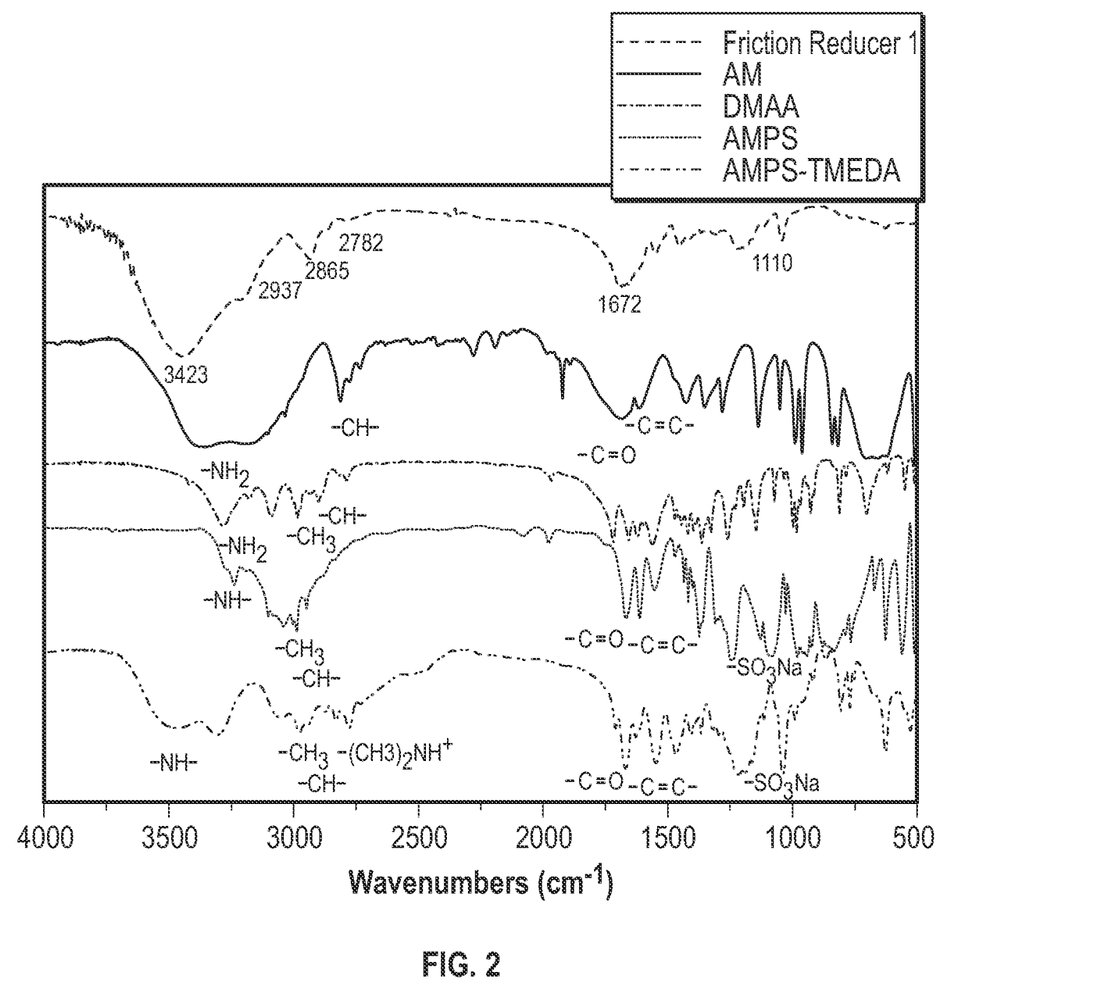
FIG. 2 is a series of Fourier Transform Infrared (FTIR) spectra of a friction reducer and monomers in accordance with one or more embodiments.

The IR spectra of Friction Reducer 1 and each monomer (i.e., AM, AMPS, DMAA, and AMPS-TMEDA) is shown in FIG. 2. In FIG. 2, the wide absorption at 3423 $cm^{-1}$ is due to the —N—H stretching vibration. The peaks at 2918 $cm^{-1}$ and 2856 $cm^{-1}$ are considered as the stretching vibration of —$CH_3$ and —C—H (—$CH_2$—) groups. The peak at 2782 $cm^{-1}$ is due to the existing of —$(CH_3)_2NH^+$, which indicate AMPS-TMEDA has been successfully introduced into the molecular structure. The peak at 1672 $cm^{-1}$ is considered as the —C═O stretching vibration. The characteristic peak of —$SO_3Na$ group is observed at 1110 $cm^{-1}$. These peaks mentioned above in copolymer Friction Reducer 1 all corresponded well with the peaks of each monomer. There is no residue in the polymer, as no peak presenting around 1650 $cm^{-1}$~1600 $cm^{-1}$ indicates no carbon double bonds exist.

The synthesized Friction Reducer 1 polymer was analyzed by gel permeation chromatography (GPC) and the results are listed in Table 1. Absolute molecular weight $M_W$ was calculated using RID and LSD signals as well as gyration radius $R_g$. Viscosity-average molecular weight $M_V$ was obtained using viscosity detector. In Table 5, it can be found that the molecular weight of Friction Reducer 1 is around 10.67 MDa.

TABLE 1

GPC results for Friction Reducer 1

| No. | $M_w$ (MDa) | $M_v$ (MDa) | $M_n$ (MDa) | PDI |
|---|---|---|---|---|
| Friction Reducer 1 | 10.67 | 12.37 | 7.71 | 1.38 |

Example 3: Viscosification of Friction Reducer 1 in Brine

The rheological properties of the synthesized sample Friction Reducer 1 were measured. The polymer solution was prepared by using a brine with a composition shown in Table 2.

TABLE 2

Brine Composition

| Brine | Cations | | | | Anions | | | Total salinity |
|---|---|---|---|---|---|---|---|---|
| | $Na^+$ | $Ca^{2+}$ | $Mg^{2+}$ | $K^+$ | $Cl^-$ | $HCO_3^-$ | $SO_4^{2-}$ | |
| Concentration (ppm) | 853 | 401 | 122 | 47 | 1,908 | 137 | 600 | 4,070 |

Figure 3:
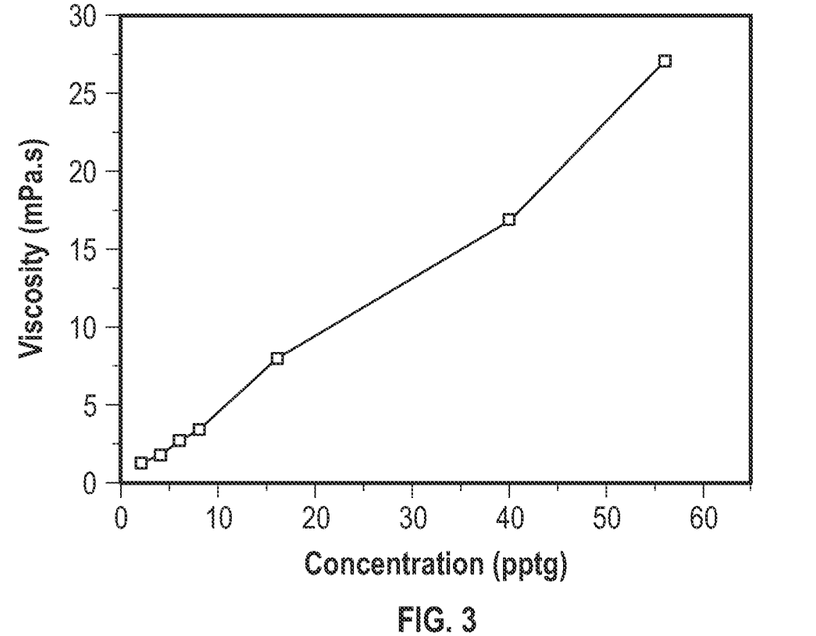
FIG. 3 is a plot showing viscosity versus concentration of friction reducer in accordance with one or more embodiments.

Brines having concentrations ranging from 2 to 60 parts per thousand gallons (pptg) were prepared to study the viscosification behavior at varying amounts of the friction reducer. The apparent viscosity of brines including Friction Reducer 1 were measured using Brookfield DVIII viscometer at shear rate of 170 $s^{-1}$. The viscosities of Friction Reducer 1 solutions at different concentrations are shown in FIG. 3. The concentration is shown in pounds per thousand gallons (pptg).

Example 4: Hydration and Viscosifying Rate of Friction Reducer 1

The hydration capacity of the synthesized sample Friction Reducer 1 was quantified by dissolution time. The dissolution time was determined as follows. 500 ml of brine was added into a flask and stirred by magnetic stirring at a rate of 1000 rpm at 25° C. to obtain a good vortex. The polymer powder (i.e. Friction reducer 1) was sprinkled into the solution within 10 s. The dissolution time was recorded and monitored by viscosity. The apparent viscosity of polymer solutions was measured by a Discovery HR-2 rheometer (TA Instrument) at a shear rate of 170 $s^{-1}$. The viscosifying rate was calculated using equation (I) as described above.

Figure 4:
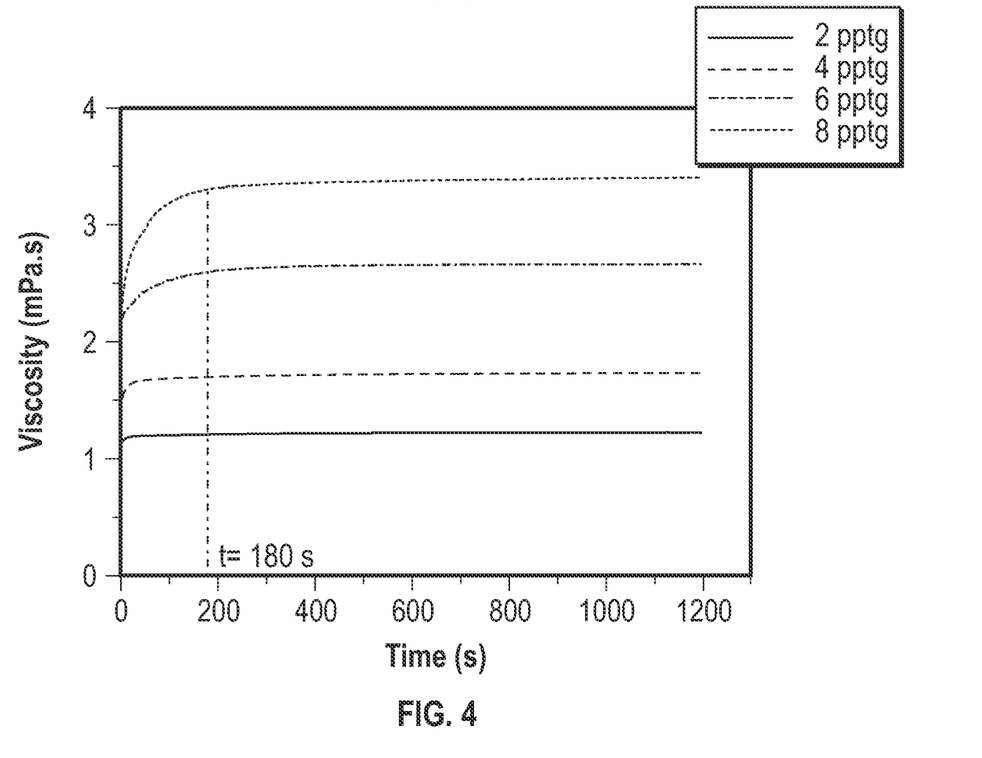
FIG. 4 is a plot showing viscosity versus time for a friction reducer in accordance with one or more embodiments.

The solubility of Friction Reducer 1 with concentration ranging from 2 pptg to 8 pptg was examined. FIG. 4 shows a plot of the viscosity versus time relationship at shear rate at 170 $s^{-1}$ for different friction reducer concentrations. The initial viscosity sharply increased within 2 minutes for all samples, which indicates polymer powders are well-dispersed and have good hydration in brines. Friction Reducer 1 shows good solubility as a dry polymer powder can achieve more than 85% equilibrium viscosity within 5 minutes in brine. The synthesized polymer has excellent hydration in brine as more than 95% equilibrium viscosity can be achieved in less than 180 sec (i.e., 3 minutes). Table 3 summarizes the viscosifying rate and hydration capacity of Friction Reducer 1 in brine.

TABLE 3

Viscosifying rate and hydration capacity

| Friction Reducer Concentration (pptg) | Viscosifying rate | | | Hydration | |
|---|---|---|---|---|---|
| | $\mu_{5\,min}$ (mPa·s) | $\mu_{4h}$ (mPa·s) | $\upsilon$ (%) | Time to 85% equilibrium viscosity (s) | Time to 95% equilibrium viscosity (s) |
| 2 | 1.21 | 1.22 | 99.18 | 10 | 22 |
| 4 | 1.70 | 1.73 | 98.27 | 10 | 50 |
| 6 | 2.63 | 2.66 | 98.87 | 22 | 117 |
| 8 | 3.34 | 3.39 | 98.52 | 47 | 127 |

Example 4: Friction Reduction Performance of Friction Reducer 1

The friction reduction test was conducted using friction flow loop. The typical procedure involved the following steps.

First, 30 L of the testing brine was added to a 70 L tank and the pump was adjusted to designed flow rate. Then, the flow was allowed to stabilize at 25° C., and initial pressure difference ($\Delta P_0$) for water flow was recorded. The temperature was maintained at testing temperature using a circulating heater during flow loop test. The friction reducer was added into the tank at the desired concentration, and the pressure difference at time ($\Delta P_t$) was recorded automatically. Equation (II) was used to calculate the friction reduction:

$$\text{Friction Reduction} = \frac{(\Delta P_0 - \Delta P_t)}{\Delta P_0} \times 100\% \qquad \text{Equation (II)}$$

where $\Delta P_0$ represents the pressure drop between the loop inlet and outlet during circulation of solution without friction reducer, and $\Delta P_t$ is the pressure drop at a given time after adding friction reducer. The flow rate in this evaluation is fixed at 8 m/s. The typical value for the pressure drip for $\Delta P_0$ ranged from 320 to 360 psi.

Figure 5:
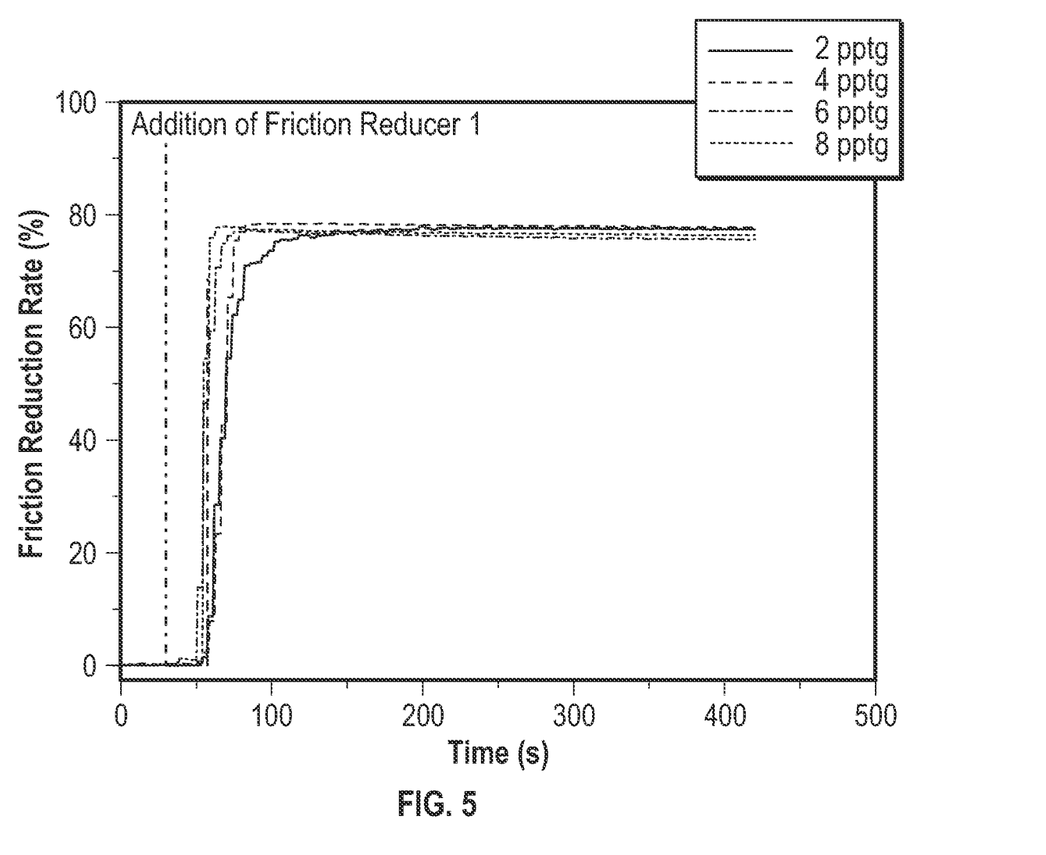
FIG. 5 is a plot showing the friction reduction rate versus time of a friction reducer in accordance with one or more embodiments.

Table 4 and FIG. 5 show the friction reduction in the flow loop through use of Friction Reducer 1 in brine at a concentration from 2 to 8 pptg. Friction reduction of 75% was obtained within 2 mins in brine. The results indicate the synthesized product has excellent performance in friction reduction with wide concentration.

TABLE 4

The friction reduction of Friction Reducer 1 with flow rate of 8 m/s

| Concentration (pptg) | 2 | 4 | 6 | 8 |
|---|---|---|---|---|
| Friction reduction (%) | 76.3 | 78.42 | 76.87 | 77.23 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A composition comprising:
    an ionic liquid monomer having a structure as shown in formula (I):

(I)

wherein n is an integer from 1 to 5 and the ionic liquid monomer has a melting point less than 100° C.

2. The composition of claim 1, wherein the ionic liquid monomer has a structure as shown in formula (II):

(II)

3. The composition of claim 1, wherein the ionic liquid monomer is a room temperature ionic liquid.

* * * * *